United States Patent
Chantland et al.

[15] 3,689,109
[45] Sept. 5, 1972

[54] TRACTOR-TRAILER COMBINATION CONNECTED FOR MANEUVERABILITY AS A UNI ASSEMBLY

[72] Inventors: Alfred Chantland; Kermit C. Chantland, both of Homboldt, Iowa

[73] Assignee: Douglas & Lomason Company, Detroit, Mich.

[22] Filed: Dec. 14, 1970

[21] Appl. No.: 97,871

[52] U.S. Cl. ................................. 280/473, 198/184
[51] Int. Cl. ............................................. B62d 53/00
[58] Field of Search ............................. 280/473, 472

[56] References Cited

UNITED STATES PATENTS

| | | |
|---|---|---|
| 1,413,575 | 4/1922 | Cochran ................ 280/473 X |
| 1,608,172 | 11/1926 | Herr ..................... 280/473 X |
| 2,707,643 | 5/1955 | Nelson .................. 280/473 X |
| 3,506,144 | 4/1970 | Carder et al. .......... 280/473 X |

*Primary Examiner*—Leo Friaglia
*Attorney*—Rudolph L. Lowell

[57] ABSTRACT

The invention includes a tractor and a trailer wherein the tractor is provided with front and rear hitch members and the trailer with corresponding front and rear tongue members relatively arranged so that when releasably connected together the tractor and trailer are held in a parallel side by side relation against relative movement. The trailer has a pair of front caster wheels and a rear wheel so as to be movable as a unit with the tractor.

5 Claims, 5 Drawing Figures

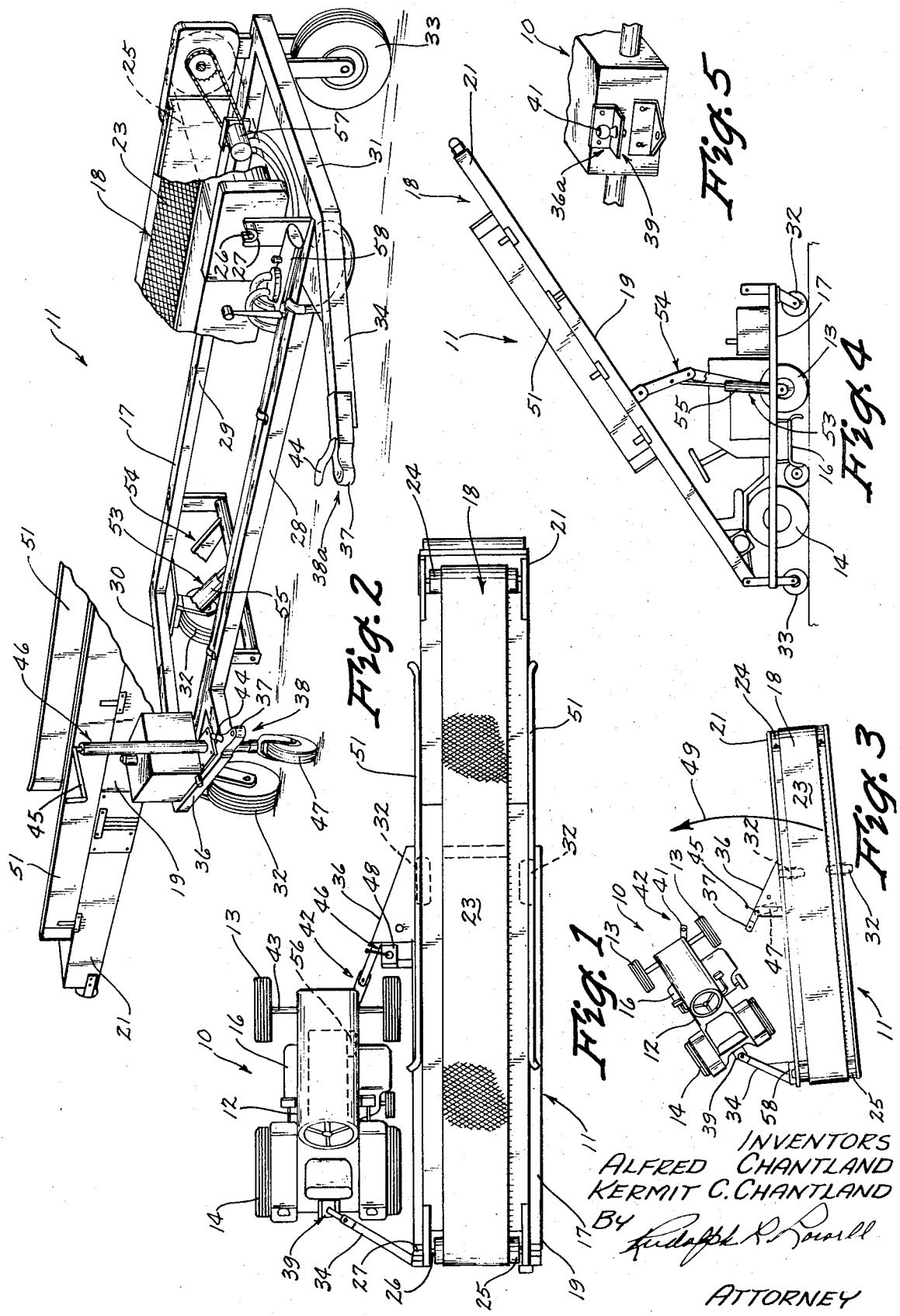

TRACTOR-TRAILER COMBINATION CONNECTED FOR MANEUVERABILITY AS A UNI ASSEMBLY

SUMMARY OF THE INVENTION

The invention provides for a quick and easy connection of a trailer in a side by side relation with a tractor for maneuverability with the tractor as a unit assembly. Equipment on the trailer can be readily powered from the tractor under the control and head-on observation of the tractor operator. The tractor and trailer are connected together in rigid assembly by a simple and quick connecting operation. Since the disconnected trailer has only ball hitch members at opposite ends thereof the tractor is readily available in a minimum of time for normal use independently of the trailer.

BRIEF DESCRIPTION OF THE DRAWINGS

FIG. 1 is a top plan view of the tractor-trailer combination of this invention with the trailer shown in assembled relation with a conveyor unit;

FIG. 2 is a perspective view of the trailer and conveyor assembly with parts of the conveyor unit broken away to more clearly illustrate the construction of the trailer;

FIG. 3 is a diagrammatic plan view showing the relative positions of the tractor and trailer during a connecting operation;

FIG. 4 is a diagrammatic illustration showing the trailer and tractor combination with the conveyor unit in an extended and elevated position; and FIG. 5 is a detail perspective view of the rear end portion of the tractor.

DETAILED DESCRIPTION OF THE INVENTION

The tractor-trailer combination of this invention is illustrated in FIG. 1 as including a tractor 10 and a trailer 11 connected together in a side by side parallel relation for travel and maneuverability as a unit assembly. The tractor shown is a model 140 John Deere that includes a main frame 12, a pair of front steering wheels 13, a pair of rear traction wheels 14 and a mower unit 16 suspended from the frame 12 at a position between the front and rear wheels. This type tractor is commonly used for cutting grass along runways of small municipal airports.

The trailer 11 includes an elongated frame structure 17 and is illustrated in assembly relation with an endless conveyor means 18 which extends longitudinally of the frame structure. The conveyor means 18 has a main section 19 overlying the frame structure 17 and a front section 21 that projects forwardly of the trailer. An endless rubber belt 23, of a construction to load and unload baggage relative to a plane (not shown), is trained about a forward roller 24 on the front section 21, and a drive roller 25 at the rear end of the main section 19. A shaft 26 for the drive roller 25 is rotatably mounted in hearing units 27 on the frame structure 17 and pivotally supports the conveyor means 18 for up and down pivotal movement of the front section 21.

The trailer frame structure 17 (FIG. 2) is of a generally rectangular shape having side members 28 and 29 and front and rear transverse members 30 and 31, respectively. A pair of transversely spaced front caster wheels 32 are mounted from the frame 17 with a wheel being located at each front corner of the frame. A rear wheel 33 is mounted from the rear transverse member 31 at a position adjacent to the side member 29.

Formed as an extension of the rear transverse member 31 is a rear tongue member 34 which projects in a forward direction laterally outwardly from the side member 28 of the trailer frame 17, and which side member will be hereinafter referred to as the inner side member. In a like manner and formed as an extension of the front transverse member 30, is a front tongue member 36 which projects in a rearward direction laterally outwardly from the inner side member 28. As best appears in FIG. 1 the projected angle of the front tongue member 36 is less than the projected angle of the rear tongue member 34 relative to the inner side member 28.

The terminal end of each tongue member 34 and 36 (FIG. 2) is provided with a socket or shell member 37 which form parts of identical front and rear coupling units designated generally as 38 and 38a, respectively, (FIG. 1). Mounted at the rear end of the tractor 10 is a rear hitch member 39 (FIG. 5) that is located substantially in the vertical plane of the longitudinal axis of the tractor. The hitch member 39 has secured thereto a ball member 41 which forms part of the rear coupling unit 36a.

A front hitch member 42 is mounted at the front end of the tractor 10 at a position located forwardly of the axle 43 for the front steering wheels 13 and projects laterally and forwardly from the side of the tractor frame 10 adjacent to the trailer 11. Similarly to the rear hitch member 39, the front hitch member 42 carries a ball member 41 for operative association with the socket member 37 provided on the front tongue member 36. The coupling units 38 and 38a are of a well-known type wherein the shell member 37 includes an operating lever 44 that is manipulated to connect and disconnect the shell member 37 relative to a corresponding ball member 41.

To facilitate the connecting together of the tractor 10 and trailer 11 there is provided on the trailer an upright manually operated jack unit 46, the lower end of which carries a ground engaging caster wheel 47. The jack unit 46 has a manually operated crank 45 operable to elevate the wheel 47 to a transport position out of engagement with the ground or to lower the wheel into a ground engaging position to elevate the front tongue member 36. As best shown in FIG. 2, the jack unit 46 is mounted on a plate member 48 that is secured to and extends between the front tongue member 36 and the inner side member 28 of the trailer frame 17.

In the connecting together of the tractor and trailer the rear tongue member 34 and the rear hitch member 39 are initially connected together by the rear coupling unit 38a, when the tractor and trailer are shown in their relative positions of FIG. 3. To position the shell member 37 of the rear coupling unit 38a above the rear ball member 41 for engagement therewith, the rear tongue member 34 may be utilized as a lever to tilt the rear end of the trailer frame 11 in an up and down direction relative to the fixed rear wheel 33.

With the rear tongue member 34 and rear hitch member 39 connected together, the front end of the trailer 11 is swung toward the tractor 10 in the direction of the arrow 49 as illustrated in FIG. 3. This winging action of the trailer 11 takes place with the jack unit 46 adjusted such that the front tongue member 36 and in turn the shell member 37 thereon is in a clearance relation with the adjacent front steering wheel 13. With the shell member 37 in a position above the ball member 41 of the front coupling unit 38, the crank 45 of the jack unit 46 is manipulated to lower the tongue member 36 for connection with the front hitch member 42. The shell member 37 and ball member 41 of the front coupling unit 38 are then locked in a coupling relation on release of the operating lever 44. The jack wheel 47 is then elevated to permit a free unobstructed ground support of the trailer frame 17 on the trailer wheels 32 and 33.

With the tractor and the trailer connected in a side by side parallel relation as shown in FIG. 1, such assembly or combination is maneuverable as a unit assembly in response to the normal operation of the tractor 10. Thus assuming a forward travel of the tractor 10, any tendency of the trailer front end to swing outwardly away from the tractor, in response to the towing pull by the rear hitch member 39, is resisted by the connection of the front tongue member 36 with the front hitch member 42.

Likewise, any tendency of the trailer rear end to swing inwardly of the tractor, in response to the pushing action at the front hitch member 42, is resisted by the connection of the rear tongue member 34 with the rear hitch member 39. The tongue members 34 and 36 thus complement each other in providing a towing action at each end of the trailer concurrently with functioning as brace members interconnected with the tractor and trailer to prevent relative movement therebetween.

To disconnect the trailer the operating lever 44 of the front coupling unit 38 is actuated to provide for the release of the shell member 37 thereof from its associated ball member 41. The screw jack 46 is then operated to elevate the front tongue member 36 and disconnect the front coupling unit 38, after which the trailer front end is swung outwardly from the tractor and the rear coupling unit 38a uncoupled.

The front section 21 of the conveyor means 18, on removal of the side guards 51, is foldable about a hinge connection 52 to a position resting upon and overlying the main section 19. With the main section 19 resting on the trailer frame 17 the conveyor means 18 is located within the dimensional confines of the trailer frame for storage purposes. In use the front section 21 is extended in longitudinal alignment with and from the main section 19 to provide a horizontally extended surface or platform for carrying luggage or the like (not shown) between a plane and a luggage claim station.

For plane loading purposes it is only necessary to pivotally move the conveyor means 18 to its tilted position shown in FIG. 4 by means of a hydraulic lift assembly, indicated generally at 53 in FIGS. 2 and 4, and including a pivoted lever structure 54 pivotally interconnecting the trailer frame 17 and the main conveyor section 19, and a hydraulic cylinder unit 55 operatively associated with an oil pump unit 56 (FIG. 1) provided on the tractor 10. The drive roller 25 for the conveyor belt 23 is driven by a hydraulic motor 57 (FIG. 2) which is also operated by the pump unit 56. The valve control unit 58 for the hydraulic cylinder unit 55 and motor 57 is located adjacent the rear end on the inner side of the trailer for convenient access by the tractor operator. It will also be apparent that the material being handled by the conveyor 18, and the operation of the conveyor, is directly visible at all times to the tractor operator.

When the trailer is disconnected from the tractor, only the hitch members 39 and 42 and their associated ball members 41 remain secured to the tractor. The tractor may thus be used as a mower, or for any normal purpose without any interference from the hitch members 39 and 42.

Although the invention has been described with respect to a preferred embodiment thereof, it is to be understood that it is not to be so limited since changes and modifications can be made therein which are within the full intended scope of this invention as defined by the appended claims.

We claim:

1. A tractor-trailer combination wherein the trailer is connectible in a side by side relation with the tractor for maneuverability with the tractor as a unit assembly:
   a. said trailer comprising an elongated horizontal frame structure having a pair of transversely spaced front caster wheels, and a single rear wheel adjacent one side thereof,
   b. a first tongue member rigidly secured to the front end portion of said frame structure and projected laterally outwardly and rearwardly from the opposite side thereof,
   c. a second tongue member rigidly secured to the rear end portion of said frame structure projected laterally outwardly and forwardly from said opposite side thereof,
   d. said tractor including a main frame having a first hitch member at the front end thereof,
   e. a second hitch member carried at the rear end of said tractor main frame, and
   f. means releasably connecting together said first and second tongue members with said first and second hitch members, respectively.

2. The tractor-trailer combination according to claim 1 wherein:
   a. said first hitch member is positioned between said tractor main frame and trailer frame structure, and said second hitch member is located substantially in the vertical plane of the longitudinal axis of said tractor, and
   b. the projected angle of the first tongue member from the opposite side of the trailer frame structure is less than the projected angle of the second tongue member from said opposite side.

3. The tractor-trailer combination according to claim 1 including:
   a. a pair of front steering wheels on said tractor frame,
   b. with the front portion of one of said steering wheels, when said tractor and trailer are connected together, located between said opposite side of the trailer frame structure and said first tongue member.

4. The tractor-trailer combination according to claim 3 wherein:
   a. said trailer frame structure, when said second tongue member and said second hitch member are releasably connected together, being pivotally swingable relative to said tractor frame to provide for the releasable connection of said first tongue member with said first hitch member.
5. The tractor-trailer combination according to claim 4 including:
   a. a third caster wheel on said trailer frame structure, and
   b. means supporting said third caster wheel on said first tongue member for adjustable up and down movement to lower and raise said first tongue member relative to said first hitch member for connection with and release therefrom.

* * * * *